United States Patent [19]

Ennis

[11] Patent Number: 5,584,090
[45] Date of Patent: Dec. 17, 1996

[54] VEHICLE WASHING APPARATUS WITH SCRUBBER CURTAIN

[75] Inventor: G. Thomas Ennis, Inglewood, Calif.

[73] Assignee: N/S Corporation, Inglewood, Calif.

[21] Appl. No.: 507,674

[22] Filed: Jul. 25, 1995

[51] Int. Cl.$^6$ ................................................ B60S 3/04
[52] U.S. Cl. ........................................ 15/97.3; 15/DIG. 2
[58] Field of Search ............................ 15/97.3, DIG. 2

[56] References Cited

U.S. PATENT DOCUMENTS

| | | | |
|---|---|---|---|
| 3,862,460 | 1/1975 | Rockafellow | 15/97.3 |
| 4,096,600 | 6/1978 | Belanger | 15/97.3 |
| 4,164,053 | 8/1979 | Shelstad | 15/97.3 |
| 4,685,166 | 8/1987 | Belanger | 15/97.3 |
| 5,325,559 | 7/1994 | Belanger | 15/DIG. 2 |

Primary Examiner—David Scherbel
Assistant Examiner—Randall E. Chin
Attorney, Agent, or Firm—Gene W. Stockman

[57] ABSTRACT

A vehicle washing apparatus having a supporting framework extending over a position of a vehicle to be washed. Two oppositely disposed legs of the framework are connected by a cross brace. A top scrubber curtain assembly includes a transverse bulkhead member pivotally supported at its ends to the tops of the legs. Bearings of ultrahigh molecular weight plastic material and cooperating rod means pivotally connect the bulkhead member to the legs. A scrubber carrier frame fixedly connected to the bulkhead member for movement therewith is provided with scrubbing strips. A motor is mounted on one of the legs below the top thereof to oscillate the carrier frame and scrubbing strips backwardly and forwardly as well as upwardly and downwardly.

7 Claims, 3 Drawing Sheets

VEHICLE WASHING APPARATUS WITH SCRUBBER CURTAIN

BACKGROUND OF THE INVENTION

1. Field of the Invention

The present invention relates to an improved vehicle washing apparatus and, more particularly, to such an apparatus having a scrubber curtain assembly which is mounted to a frame at only two points.

2. Background of the Invention

Various prior art vehicle washing devices have heretofore been known for scrubbing the top of a vehicle. Many such prior art devices, however, have the disadvantages of being unduly complicated and expensive to manufacture and maintain. Other such prior art devices are of too high an overall height since the drive motor and drive train for a scrubber curtain are mounted above and overhead of the curtain, usually directly over the center of the position of a vehicle to be washed. See, for example, my U.S. Pat. No. 3,711,883 issued Jan. 23, 1973. The prior art devices also often employ mechanical bearings for supporting various rotating parts. These bearings tend to wear out during use and must be periodically serviced and/or replaced.

SUMMARY OF THE INVENTION

It is an object of the present invention to provide a vehicle washing apparatus having a top scrubber curtain oscillated by a drive motor which is mounted below the top of the apparatus.

Another object of the present invention is to provide a vehicle washing apparatus having a top scrubber curtain assembly pivoted to a frame at only two points outside the position of a vehicle to be washed.

A further object of the present invention is to provide a vehicle washing apparatus employing bearings of ultrahigh molecular weight plastic material for pivotally supporting a top scrubber curtain assembly.

The present invention achieves the above and other objects by providing a vehicle washing apparatus having a supporting framework extending over a position of a vehicle to be washed and which includes a leg on each side of the position. The legs are connected by a cross brace frame member. A top scrubber curtain assembly includes a transverse bulkhead member pivotally supported at its ends to the legs adjacent the tops thereof. Bearing means of ultrahigh molecular weight plastic material and cooperating rod means pivotally connect the bulkhead member to the legs. A scrubber carrier frame is fixedly connected to the bulkhead member for movement therewith. Vehicle scrubbing means such as strips of a fur-like material are attached to and depend from the carrier frame. Motor drive means are provided for oscillating the carrier frame and the scrubbing means backwardly and forwardly as well as upwardly and downwardly. The motor drive means are mounted on one of the legs below the top thereof.

These, together with other objects and advantages, which will be subsequently apparent, reside in the details of construction and operation as more fully described and claimed hereinafter, reference being made to the accompanying drawings forming a part hereof, wherein like numerals refer to like parts throughout.

BRIEF DESCRIPTION OF TEE DRAWINGS

DESCRIPTION OF THE PREFERRED EMBODIMENTS

Figure 1:
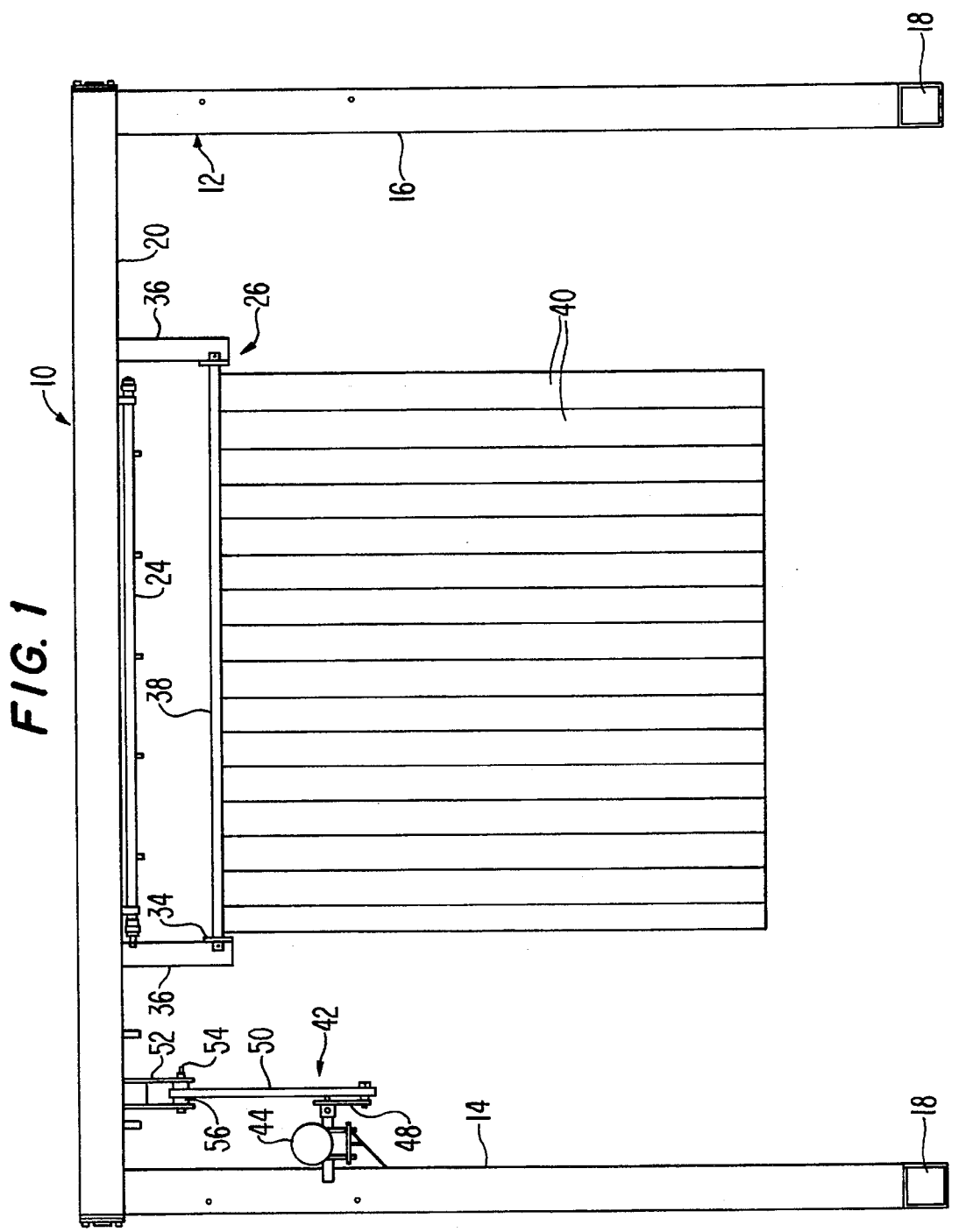
FIG. 1 is a front view of a vehicle washing apparatus according to the present invention.

Referring to the drawings, a vehicle washing apparatus, generally referred to by the numeral 10, is shown which includes a supporting framework 12 extending over a position or path of a vehicle to be washed. The framework includes a first leg 14 mounted on one side of the position or path of a vehicle and a second leg 16 mounted on the other side. A base member 18 is provided for support at the bottom of each leg. Each leg preferably is comprised of a square hollow tube constructed of aluminum. A cross brace aluminum frame member 20 is connected to the tops of the legs by any suitable means such as plates 22 welded to the legs and the frame member. A spray pipe 24 is attached to the bottom of the frame member 20 to supply suitable cleaning liquids such as soap and water to the surface of a vehicle being washed.

Figure 2:
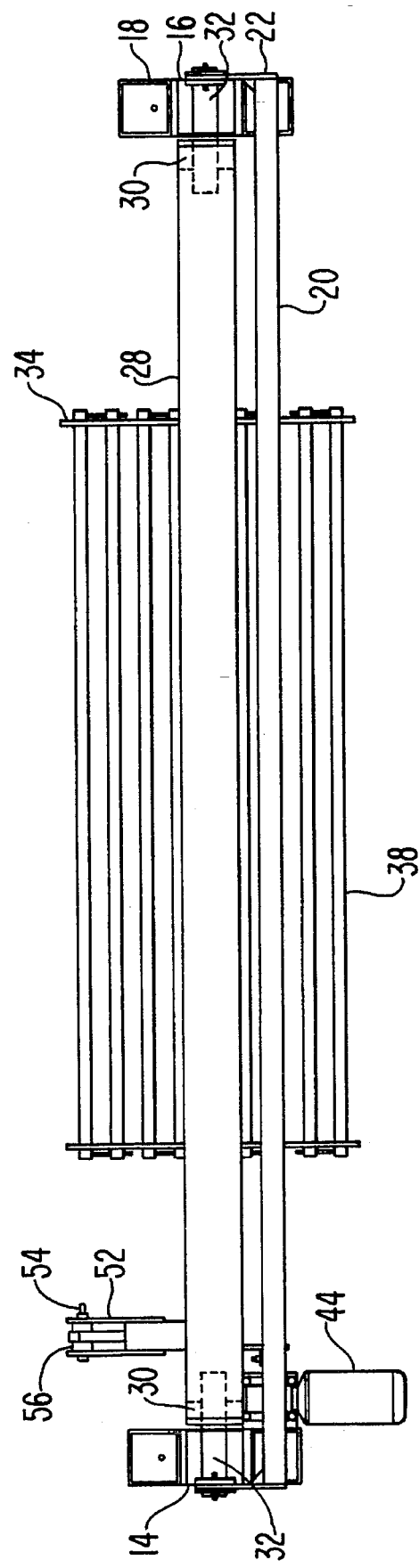
FIG. 2 is a top view of the vehicle washing apparatus shown in FIG. 1.

A top scrubber curtain assembly 26 includes a transverse aluminum tubular bulkhead member 28 pivotally connected at its ends to the legs adjacent the tops thereof as most clearly shown in FIG. 2. The pivotal connecting means include a bearing 30 constructed of an ultrahigh molecular weight plastic mounted inside the tube at each end thereof which cooperates with an aluminum rod or pin 32 mounted adjacent the top of each leg. Each pin 32 extends through holes in each leg and into a central opening of the associated bearing member 30. The ultrahigh molecular weight plastic material has long lasting wearing qualities and does not require the use of separate mechanical bearings. Accordingly, frequent replacement of the bearings is eliminated and the longevity and usefulness of the device is increased.

Figure 3:
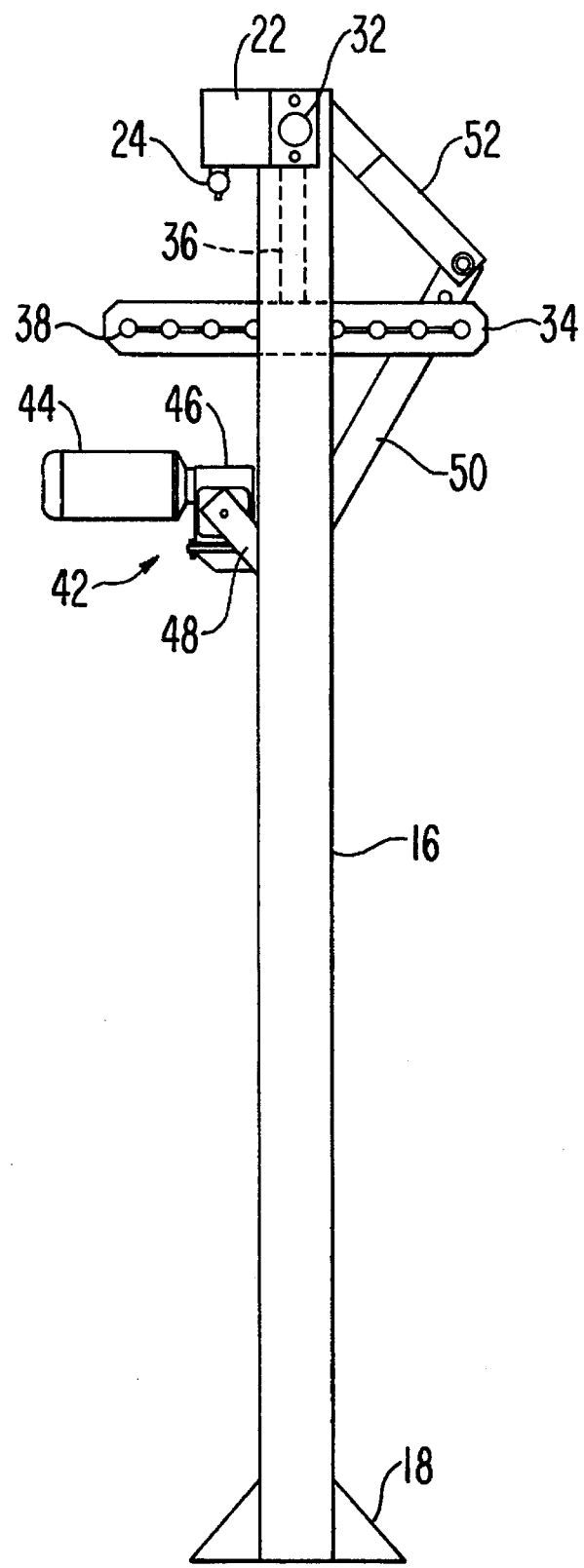
FIG. 3 is a side elevational view of the vehicle washing apparatus shown in FIG. 1.

A scrubber curtain carrier frame 34 is fixedly connected to the bottom of bulkhead member 28 by a pair of spaced, rigid arms 36 rigidly attached between the ends of the carrier frame and the bulkhead member as shown in FIGS. 1 and 3. The carrier frame includes a plurality of spaced rods 38 extending lengthwise of the frame. Attached to each rod and depending therefrom are a plurality of elongated strips 40 of a suitable cleaning material which form the scrubber curtain as shown in FIG. 1. For simplicity the strips are not shown in FIG. 3. The strips 40 may be constructed of any suitable cleaning material such as fiber or cloth. A preferred type of cleaning material is a fur type material such as a deep pile, tufted (randomly oriented), monofilament fibrous material manufactured by Borg Fabrics of New York, N.Y. This material is described more fully in my U.S. Pat. No. 5,077,859 issued Jan. 7, 1992 which is incorporated herein by reference.

Drive means 42 for rotating the bulkhead member 28 and oscillating the curtain strips 40 include a suitable motor such as electric motor 44 mounted to leg 14 below the top thereof and connected through a gearbox 46 to a crank arm 48. The crank arm 48 in turn is pivotally connected to one end of a connecting rod 50 constructed of an ultrahigh molecular weight plastic material. The other end of the connecting rod is pivotally connected to a bracket arm 52 fixedly connected to the bulkhead member 28 adjacent one end thereof. As shown in FIGS. 1 and 2, the other end of the connecting rod is attached to bracket arm 52 by a pin 54. Ultrahigh molecular weight plastic spacers 56 center the connecting rod on the pin 54.

Rotation of the motor is transferred through the crank arm 48, connecting rod 50 and bracket arm 52 to the bulkhead member 28, causing the carrier frame and scrubber strips to move or oscillate forwardly and backwardly and upwardly and downwardly to create a highly satisfactory cleaning action.

The above described arrangement permits the drive motor to be mounted on one of the legs below the top of the apparatus and the curtain carrier frame rather than above the curtain carrier frame, thus enabling a lowering of the overall height of the apparatus. By mounting the motor lower, it is more readily accessible for service and maintenance. Moreover, by utilizing only two bearings located outside of the position or path of a vehicle to be washed for pivoting the entire scrubber assembly, the apparatus is much simpler in construction than other prior art devices.

While the drawings only show the legs 14 and 16 as being exactly opposite to each other on each side outside of the position or path of a vehicle to be washed, the legs may be offset from each other either forwardly or backwardly so that the scrubber strips move at an angle to the position of a vehicle.

Numerous other modifications and adaptions of the present invention will be apparent to those skilled in the art and thus, it is intended by the following claims to cover all such modifications and adaptions which fall within the true spirit and scope of the invention.

I claim:

1. A vehicle washing apparatus comprising:

a supporting framework extending over a position for a vehicle to be washed, said framework comprising a single leg mounted on each side of said position and a cross brace frame member connected to said legs and extending transversely to said legs;

a bulkhead member pivotally connected at its ends to said legs adjacent the tops of said legs and extending transversely to said legs;

means pivotally connecting said bulkhead member to said legs, said pivotally connecting means including bearing means and cooperating rod means extending through said bearing means;

a carrier frame connected to said bulkhead member for movement therewith;

vehicle scrubbing means attached to and depending from said carrier frame; and drive means for oscillating said carrier frame and said vehicle scrubbing means backwardly and forwardly over said position; said drive means comprising:

a motor mounted on the inside of one of said legs below the top thereof and positioned below the level of said carrier frame; and a connecting rod connected at a first lower end thereof to said motor and extending upwardly and connected at a second upper end to said bulkhead member to oscillate said bulkhead member.

2. A vehicle washing apparatus according to claim 1 wherein said connecting rod is comprised of an ultrahigh molecular weight plastic material.

3. A vehicle washing apparatus according to claim 1 wherein said bearing means are comprised of an ultrahigh molecular weight plastic material.

4. A vehicle washing apparatus according to claim 3 wherein said bearing means are mounted on said bulkhead member and said rod means are mounted on said legs.

5. A vehicle washing apparatus according to claim 1 which further includes a spray pipe mounted to said cross brace frame member.

6. A vehicle washing apparatus comprising:

a supporting framework extending over a position for a vehicle to be washed, said framework comprising a single leg mounted on each side of said position and a cross brace frame member connected to said legs and extending transversely to said legs;

a bulkhead member pivotally connected at its ends to said legs adjacent the tops of said legs and extending transversely to said legs;

means pivotally connecting said bulkhead member to said legs, said pivotally connecting means including bearing means comprised of an ultrahigh molecular weight plastic material mounted on said bulkhead member and rod means mounted on said legs extending through said bearing means;

a carrier frame connected to said bulkhead member;

vehicle scrubbing means attached to and depending from said carrier frame; and drive means for oscillating said carrier frame and vehicle scrubbing means backwardly and forwardly over said position, said drive means comprising:

a motor mounted on the inside of one of said legs below the top thereof and positioned below the level of said carrier frame; and a connecting rod connected at a first lower end thereof to said motor and extending upwardly and connected at a second upper end to said bulkhead member to oscillate said bulkhead member.

7. A vehicle washing apparatus according to claim 6 which further includes a spray pipe mounted to said cross brace member.

* * * * *